United States Patent

[11] 3,590,840

| [72] | Inventor | James M. Hyer |
| | | South Bend, Ind. |
| [21] | Appl. No. | 732,937 |
| [22] | Filed | May 29, 1968 |
| [45] | Patented | July 6, 1971 |
| [73] | Assignee | The Bendix Corporation |

[54] FLUIDIC CONTROL APPARATUS
13 Claims, 3 Drawing Figs.

[52] U.S. Cl. ..................................... 137/81.5, 261/36
[51] Int. Cl. ..................................... F15c 1/14
[50] Field of Search .......................... 137/81.5; 261/24, 28, 29, 35, 36

[56] References Cited
UNITED STATES PATENTS

| 3,421,173 | 1/1969 | Jones, Jr. | 137/81.5 X |
| 3,302,935 | 2/1967 | York, Jr. | 137/81.5 X |
| 3,339,571 | 9/1967 | Hatch, Jr. | 137/81.5 |
| 3,378,022 | 4/1968 | Sorenson | 137/81.5 |
| 3,386,709 | 6/1968 | Drayer | 137/81.5 X |
| 3,386,710 | 6/1968 | York, Jr. | 137/81.5 X |
| 3,388,898 | 6/1968 | Wyczalek | 137/81.5 X |
| 3,389,894 | 6/1968 | Binder | 137/81.5 X |
| 3,406,951 | 10/1968 | Marks | 137/81.5 X |

Primary Examiner—William R. Cline
Attorneys—Gordon H. Chenez and Plante, Arens, Hartz and O'Brien ABSTRACT: The present invention concerns a fluidic control apparatus for controlling a hydraulic output flow by means of a fluid input comprised of a fluidic amplifier means responsive to a variable fluid differential pressure input with a variable mixture control means operatively connected to said fluidic amplifier means for controlling a hydraulic output in proportion to said input differential. Further, the device may have a mixture control trimming means intermediate said variable fluid differential pressure input and said fluidic amplifier means for adjusting minimum and maximum hydraulic output flow.

INVENTOR.
JAMES M. HYER
BY
Plante, Arens, Hartz & O'Brien
ATTORNEYS 3,590,840

1

FLUIDIC CONTROL APPARATUS

BACKGROUND OF THE INVENTION

Fuel injection systems with which I am familiar are based on the principle of measuring combustion engine air consumption by use of a venturi tube, which provides, through static and dynamic pressure sensing elements, a differential pressure signal that is a function of the airflow therethrough. This differential is used to control fuel flow to the engine in order to maintain a constant fuel-to-air ratio. These present injection systems use large diaphragms as the pressure-measuring elements since the differential pressure developed across the venturi tube is low. Further, mechanical linkages are generally used to communicated the diaphragm movement to the actual fuel control mechanism. These devices inherently have excessive hysteresis problems resulting from the mechanical friction and tolerance effects inducing errors into the force levels associated with the differential pressure developed across the venturi tube. These undesirable attributes of existing fuel injection devices result in inaccuracies and reduced sensitivity when used in association with system applications. Although this invention is shown embodied in a fuel injection system, it is felt that the concept may be used for any application where control of a hydraulic output flow as a function of a fluid differential pressure input is desired.

SUMMARY OF THE INVENTION

It is the purpose of this invention to provide a fluidic control apparatus for controlling a hydraulic output flow by means of a fluid differential input pressure. The accuracy and sensitivity of the invention will be vastly improved due to elimination of the excessive hysteresis resulting from the diaphragms employed for sensing pressure differentials in conventional devices. A significant gain in reliability will be achieved through a sizeable reduction in the number of moving parts. Further, a smaller packaging volume will be required to retain the device. The apparatus will be easier to manufacture and therefore, cost less as a finished product. Installation of the fluidic control apparatus in terms of ease of calibration and routine maintenance will provide a significant improvement over prior devices due to its novel simplicity and functional reliability.

DESCRIPTION OF THE PREFERRED EMBODIMENT

Figure 1:
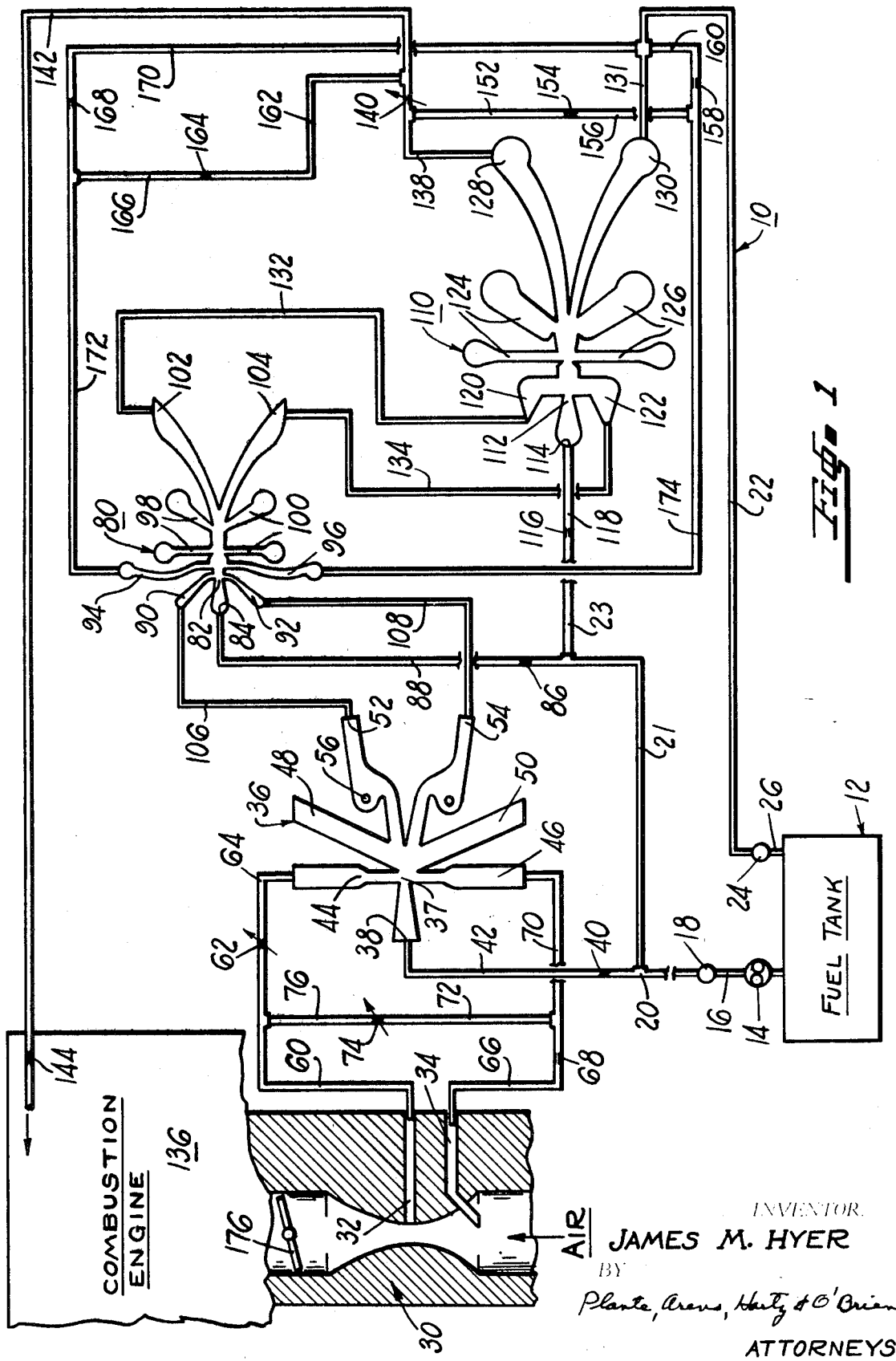
FIG. 1 is a sectional schematic of the components comprising the fluidic control apparatus.

Referring now to the drawing, illustrating the preferred embodiment of the invention, the fluidic control apparatus is shown herein as a fuel injection system and is indicated by reference numeral 10 and would normally be mounted to a piston-type engine. Additionally, the fuel injection system 10 could be suitably installed for use with a gas turbine or any other combustion engine. The fuel injection system 10 is by its design concept very small in physical size, which facilitates its adaptation to almost any space allocation available in the engine compartment. Further, the device may be manufactured of laminated metal sheets such that its physical properties can withstand the high-temperature, vibration and shock characteristics of the engine compartment environment. For lower temperature environments, the device may be made of molded or laminated plastics.

The fuel injection system 10 has a source of fluid fuel from the fuel tank 12. The fuel is pressurized by pump 14 and communicated through passage 16, check valve 18 and passage 20 to the fuel injection system 10. The fuel tank 12 further has passage 22, check valve 24 and passage 26 for returning relatively low pressure unused fuel to the tank for recirculation. Check valves 18 and 24 are to preclude loss of fuel to the ambient through the fuel injection system 10 during inoperative periods should the fuel reservoir 12 be located at a higher lever than the fuel injection system 10.

The fuel injection system 10 has a venturi-type flow-sensing device 30 including static and dynamic pressure sensing elements 32 and 34, which communicate respectively with the throat of the venturi and upstream thereof.

A first proportional fluidic amplifier 36 comprised of an orifice 37, an input source of pressurized fuel 38 received from passage 20 via a restriction 40 and passage 42, control ports 44 and 46, low-pressure zones 48 and 50, and output passages 52 and 54 with vents 56 and 58, respectively, receives a variable differential pressure input from said sensing device 30. The static pressure sensing element 32 communicates a pressure through passage 60, variable restriction 62 and passage 64, to said control port 44. The dynamic pressure sensing element 34 communicates a pressure through passage 66, fixed restriction 68 and passage 70, to said control port 46. The differential pressure between the dynamic element 34 and the static element 32 is proportional to the square of the airflow. A passage 72 is connected to passage 70 and communicates through a variable restriction 74 and passage 76 to connect with passage 60. The purpose for and function of restrictions 62, 68 and 74 will be explained hereinafter.

The orifice 37 and said input source of pressurized fuel 38 of said first proportional fluidic amplifier 36 cooperate to direct a jet of fuel past said control ports 44 and 46, through said low-pressure zones 48 and 50 with said jet splitting equally into said output passages 52 and 54 in the absence of a differential pressure across said control ports 44 and 46. With a differential pressure applied across said control ports 44 and 46, the jet of fuel emitted from orifice 37 will be proportionally diverted into said output passages 52 and 54 as a function of which control port has the higher pressure level and how much higher it is relative to the other control port. Further, when control port 46 has the higher pressure level the jet of fuel will be proportionately diverted into output branch 52. It is noted that in this device the control port 46 will always have the higher pressure level relative to control port 44 since by its nature the dynamic pressure sensing element 34 of the airflow-sensing device 30 will always be of a higher pressure level than the static pressure sensing element 32 in the presence of airflow.

Output branches 52 and 54 have vents 56 and 58, respectively, through which the otherwise hydraulic system is substantially purged of air entering the control ports from said air flow sensing device 30.

A second proportional fluidic amplifier 80 is comprised of an orifice 82, an input source of pressurized fuel 84 received from passages 20 and 21 via a restriction 86 and passage 88, first control ports 90 and 92, second control ports 94 and 96, low-pressure zones 98 and 100, and output passages 102 and 104. Control port 90 communicates with said output passage 52 of said first proportional fluidic amplifier through passage 106. Control port 92 communicates with said output passage 54 of said first proportional fluidic amplifier through passage 108.

The orifice 82 and said input source of pressurized fuel 84 of said second proportional fluidic amplifier 80 cooperate to direct a jet of fuel past said first control ports 90 and 92 and said second control ports 94 and 96, through said low-pressure zones 98 and 100 with said jet splitting equally into said output passages 102 and 104 in the absence of a differential pressure across said first control ports 90 and 92 or said second control ports 94 and 96. With a differential pressure applied across said first control ports 90 and 92, the jet of fuel emitted from orifice 82 will be proportionally diverted into said output passages 102 and 104 as a function of which control port has the higher pressure level and how much higher it is relative to the other control port. Further, when control port 90 has the higher pressure level, the jet of fuel will be proportionally diverted into output branch 102.

Likewise, control of said jet of fuel can also be accomplished with said second control ports 94 and 96. Thus, with a differential pressure applied across said second control ports 94 and 96, the jet of fuel emitted from orifice 82 will be proportionally diverted into said output passages 102 and 104 as a function of which control port has the higher pressure level and how much higher it is relative to the other control port. Further, when control port 96 has the higher pressure level the jet of fuel will be proportionally diverted into output branch 104. In like manner, should control port 94 have the higher pressure level the jet of fuel will be proportionally diverted into output branch 102. Thus, the control of said jet of fuel by said second control ports 94 and 96 can be used to assist or oppose the control of said jet of fuel by said first control ports 90 and 92.

In the application of the fuel injection system 10, control port 90 will always have the higher pressure level relative to control port 92 since output passage 52 of fluidic amplifier 36 will always have the higher pressure level relative to output passage 54 in response to the airflow-sensing device 30.

A third proportional fluidic amplifier 110 is comprised of an input orifice 112, an input source of pressurized fuel 114 received from passages 20, 21, and 23 via a restriction 116 and passage 118, control ports 120 and 122, low-pressure zones 124 and 126, and output passages 128 and 130. Control port 120 communicates with said output branch 102 of said second proportional fluidic amplifier through passage 132. Control port 122 communicates with said output branch 104 of said second proportional fluidic amplifier through passage 134.

The orifice 112 and said input source of pressurized fuel 114 of said third proportional fluidic amplifier 110 cooperate to direct a jet of fuel past said control ports 120 and 122, through said low-pressure zones 124 and 126 with said jet splitting equally into said output passages 128 and 130 without the presence of a differential pressure across said control ports 120 and 122. With a differential pressure applied across said control ports 120 and 122, the jet of fuel emitted from orifice 112 will be proportionally diverted into said output passages 128 and 130 as a function of which control port has the higher pressure level and how much higher it is relative to the other control port. Therefore, when control port 120 has the higher pressure level, the jet of fuel will be proportionally diverted into output passage 128. Conversely, when control port 122 has the higher pressure level, the jet of fuel will be proportionally diverted into said output passage 130.

As will be obvious to those skilled in the art, the proportional fluidic amplifiers 36, 80, and 110 may respectively have different output to input gains designed to give the overall fuel injection system the performance desired. Likewise, the fixed restrictions 40, 86, and 116 are of predetermined design to attain the required pressure of input source fuel for each of the fluidic amplifiers.

Additionally, the third proportional fluidic amplifier 110 described above, is disclosed and claimed in pending application Ser. No. 656,135, filed July 26, 1967, now U.S. Pat. No. 3,486,520 issued Dec. 30, 1968 and having in common with this application the same assignee. Moreover, the second proportional fluidic amplifier 80 herein described is a form of the fluidic amplifier disclosed in said U.S. Pat. No. 3,486,520. In general, the fluid amplifiers 110 and 80 are of the so-called "-deflector type" of U.S. Pat. No. 3,486,520 which includes converging walls between which the jet flow generated by orifice 82 of amplifier 80, for example, passes. The converging walls are suitably located downstream from control ports 90, 92 and 94, 96 such that a deflection of the jet flow from its central position toward control port 92 results in impingement of the jet flow with the adjacent wall which wall, in turn, deflects the jet flow angularly in the opposite direction to direct corresponding more jet flow to output passage 102. Likewise, deflection of the jet flow from its central position toward control port 90 causes the corresponding adjacent wall to deflect the jet flow toward output passage 104. Like amplifier 80, amplifier 110 is provided with converging walls which deflect the jet flow.

Output passage 130 of said third proportional fluidic amplifier 110 communicates through passage 131 to fuel return passage 22 for recirculating unused fuel.

Output passage 128 of said third proportional fluidic amplifier 110 communicates fuel to the engine 136 through passage 138, variable area restriction 140 and passage 142. Restriction 144 shown inside the block representing the engine in FIG. 1, depicts the combined orifice area of all the engine cylinder injectors to simplify the drawing. It will be obvious to those skilled in the art that one or more injectors may be employed depending upon the application.

Figure 2:
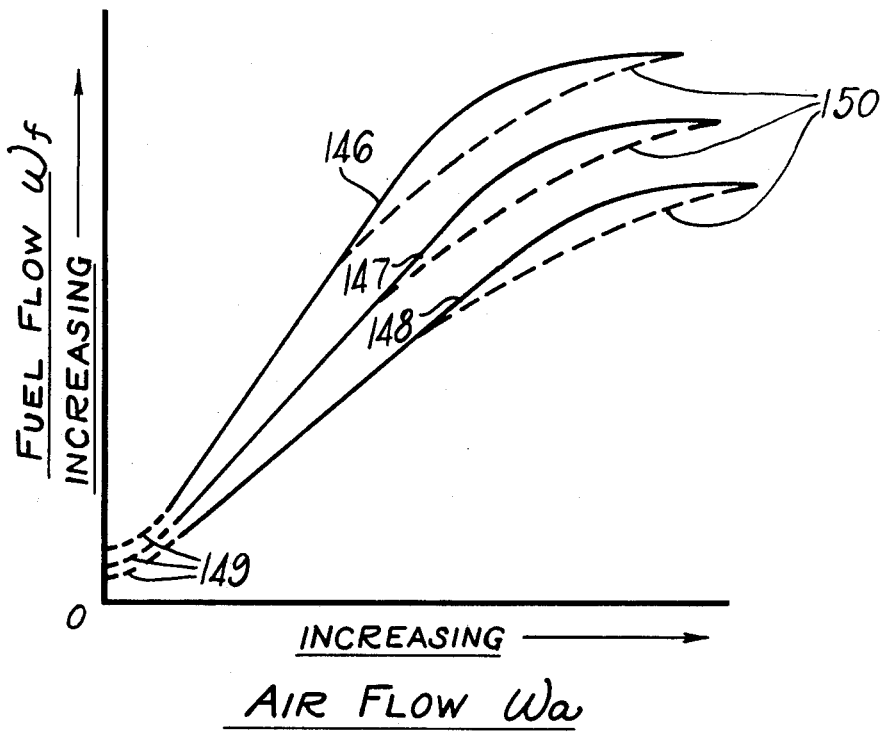
FIG. 2 is a graph showing the fuel flow to the engine as a function of airflow to the engine which the fuel injection system is capable of performing, including, the effect on the relationship of a variable mixture control and trimming means therefore.

Variable-area restriction 140 would normally have mechanical linkage attached thereto (but not shown) to facilitate adjustment by an operator. Thus, as the area of restriction 140 is adjusted to be larger, more fuel will be injected to the engine 136, for a given amount of air. The Curves of FIG. 2 depict typical fuel-to-air mixture characteristics of the combustion engine 136. Fuel flow, $W_f$, is plotted along the ordinate as a function of airflow, $W_a$, plotted along the abscissa. The curves 146, 147, and 148 depict three progressively smaller area settings of the variable restriction 140. The variable area restriction 140 can be completely closed to stop fuel flow to the engine. Thus, the restriction 140 may be used for shutting off the engine. Additionally, as can be seen from FIG. 2, fuel flow varies proportionally to the airflow.

It will be recognized that airflow passing through the airflow-sensing device 30 passes to the cylinders of combustion engine 136.

The fuel-to-air mixture provided to the combustion engine 136 is controlled as a function of the setting of the variable-area restriction 140. Further controls may be used to provide for a minimum amount of fuel flow at all operable times to allow the engine to idle properly and to limit the maximum amount of fuel availability for precluding damage to the engine. Variable-area restriction 62 may be adjusted to control minimum fuel flow and variable-area restriction 74 may be adjusted to control maximum fuel flow. Assuming that the combustion engine 136 has been started and the fuel injection system 10 is energized by means of pump 14 pressurizing the fuel and a relatively low airflow is passing through the airflow-sensing device 30; the jet of fuel from orifice 37 will aspirate air from control ports 44 and 46. With no restrictions intermediate the control ports 44 and 46 and the airflow-sensing device 30, the control ports would each aspirate the same amount of air and the jet of fuel would proportion equally in the output passages 52 and 54. However, while the engine 136 is idling and there is little airflow through the venturi, variable restriction 62 is set so as to reduce the aspiration or pressure at control port 44 relative to control port 46 and thus determine minimum fuel flow to engine 136. This minimum fuel flow for each of the curves 146, 147 and 148, is designated by numeral 149 in FIG. 2. Further, restrictions 68 and 74 have sufficiently large areas relative to the area of restriction 62, that only very small pressure drops thereacross exist during the period the engine idles. As airflow through the sensing device 30 increases, the airflow in the dynamic sensing element 34 increases and the airflow in static sensing element 32 decreases so as to allow the fuel flow to vary as a function of the airflow as depicted by curve 146 in FIG. 2. As the differential pressure from dynamic sensing element 34 to static sensing element 32 increases, the effect of variable restriction 74 is insubstantial until a predetermined differential pressure is reached, at which time the variable restriction 74 begins to bleed off more pressure from the dynamic sensing element 34 to static sensing element 32 as a function of the predetermined area setting of variable restriction 74; and thus, fixes the maximum pressure at control port 46 as a function of the pressure drop across fixed restriction 68. Therefore, the setting of the variable-area restriction 74 determines the maximum fuel flow to engine 136.

The effect of variable-area restriction 74 on each of the typical fuel-to-air mixture settings of variable area restriction 140, represented by curves 146, 147, and 148, is designated by numeral 150 in FIG. 2. During the maximum airflow through the venturi there is essentially no airflow through variable restriction 62, thus effectively, the restriction 62 is not in the circuit. Therefore, the restrictions 62, 68, and 74 function to trim the minimum and maximum extremes of the fuel-to-air mixture relationships provided by variable restriction 140.

It is noted that variable area restrictions 62 and 74 are independently adjustable. Further, the adjustment of these restrictions is usually accomplished during installation of the control apparatus on an engine.

It may be parenthetically mentioned that should it be desirable to operate the fluidic amplifier 36 in response to a liquid input differential, the restrictions 62, 68, and 74 may be removed.

Passage 152, restriction 154, passage 156, restriction 158, and passage 160 are in series flow relationship between passage 138 and fuel return passage 22. Passage 162, restriction 164, passage 166, restriction 168, and passage 170 are in series flow relationship between passage 142 and fuel return passage 22. Control port 94 is connected by means of feedback passage 172 to passage 166 intermediate restrictions 164 and 168. Control port 96 of said second fluidic amplifier 80 is connected by means of feedback passage 174 to passage 156. Thus, there is developed across control ports 94 and 96 a differential fuel pressure which varies as a function of the pressure drop across the variable-area restriction 140 and thus, also as a function of the fuel flow being injected to the combustion engine. The differential fuel pressure developed across control ports 94 and 96, to enable said ports to function as servo feedback, may be suitably selected by restrictions 154, 158, 164, and 168 to balance and null the differential fuel pressure being applied across control ports 90 and 92. It is further noted that a high fuel pressure level must be provided to control port 96 relative to control port 94 to balance the higher fuel pressure level of control port 90 relative to control port 92.

The combustion engine 136 is further provided with a variable throttle control 176 to vary therewith the air intake of the engine. The throttle 176 may have mechanical linkage to provide the operator remote control thereof.

The fuel injection system 10 can be readily adapted to operate with a variety of combustion engines by specifically selecting the proper areas for restrictions 140, 154, 158, 164, and 168, to give the required fuel-to-air mixture and by selecting restrictions 62, 68, and 74 to provide the necessary trimming thereof.

Figure 3:
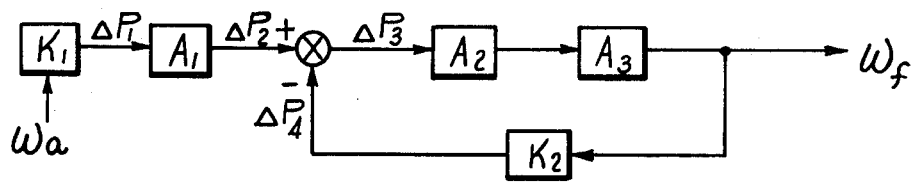
FIG. 3 is a block diagram representation of circuit illustrated in FIG. 1.

With reference now to FIG. 3, there is shown a simplified block diagram of the fluidic fuel injection system 10 hereinabove described, wherein the conventional fuel system terms used are defined as follows:

$W_a$ = Airflow through the airflow-sensing element 30;
$W_f$ = Fuel flow to the combustion engine 136;
$K_1$ = A constant for the airflow-sensing element 30;
$K_2$ = A constant for the restrictions 140, 154, 158, 164, and 168;
$A_1$ = Gain of fluidic amplifier 36;
$A_2$ = Gain of fluidic amplifier 80;
$A_3$ = Gain of fluidic amplifier 110;
$\Delta P_1 = (1/K_1) W_a^2$ = The differential pressure provided to the fluidic amplifier 36 by the air flow sensing element 30;
$\Delta P_2$ = The differential pressure provided to the fluidic amplifier 80 by the outputs of fluidic amplifier 36;
$\Delta P_3 = A_1 \Delta P_1$;
$\Delta P_4 = (1/K_2) W_f^2$ = The differential pressure feedback from the output of fluidic amplifier 110 to inputs of the fluidic amplifier 80, as predetermined by the restrictions 140, 154, 158, 164, and 168.

$\Delta P_3 = A_2 A_3 (\Delta P_2 \Delta P_4)$ and thus, by substitution:
$\Delta P_3 = A_2 A_3 [A_1 \Delta P_1 / (1/K_2) W_f^2]$;
If $A_2 A_3$ is large; then, $\Delta P_3 = 0$;
Therefore: $A_1 \Delta P_1 \times (1/K_2 W_f^2)$;
By substitution: $(A_1/K_1) W_a^2 = (1/K_2) W_f^2$;
Thus, it follows that:

$$\frac{W_f}{W_a} = \sqrt{\frac{K_2}{K_1} A_1} = \text{Constant}$$

The fluidic fuel injection system, as shown by the mathematical expressions above, can be seen to have an output fuel flow to the combustion engine 136 that varies as a function of the airflow through the airflow sensing element 30.

MODE OF OPERATION OF THE PREFERRED EMBODIMENT

Assuming the closed loop fuel injection system 10 is operating at point A of the curve shown in FIG. 2 and is nulled; the fuel being injected into the engine 136 varies as a function of the airflow as measured across the dynamic pressure sensing element 34 and the static pressure sensing element 32 of the airflow-sensing device 30.

In view of the fact that the dynamic pressure level from element 34 is always higher than the static pressure level from element 32, control port 46 is always of a higher pressure level than control port 44. Thus, output passage 52 of fluidic amplifier 36 and control port 90 of fluidic amplifier 80 will always be of a higher pressure level than output passage 54 of fluidic amplifier 36 and control port 92 of fluidic amplifier 80. Similarily, output passage 102, control port 120 and output passage 128 operatively connected to the variable-area restriction 140 will remain at a higher pressure level than output passage 104, control port 122 and output passage 130, respectively. A differential fuel pressure is developed across said variable-area restriction 140 and communicated to said control ports 94 and 96 by passage 162, restriction 164, passage 166 and passage 172; and passage 152, restriction 154, passage 156, and passage 174, respectively. Since the source of fuel pressure for control port 96 is taken upstream from said variable-area restriction 140, its fuel pressure level will always be higher than that of control port 94 which is taken downstream from said variable-area restriction 140. Thus, control port 96 opposes control port 90 to maintain the fuel injection system 10 in a nulled condition. In the nulled condition, fuel is being injected into the engine 136 as a function of the airflow to said engine 136, and as a function of the manual setting of said variable-area restriction 140.

Assuming that additional engine power is desired, the throttle control 176 is opened wider to allow more airflow to the combustion engine 136. The additional airflow through the airflow-sensing device 30 will result in a larger pressure drop across said static and dynamic sensing elements 32 and 34, respectively. This increased pressure differential will be reflected across said control ports 44 and 46, respectively, so as to deflect a higher proportion of the jet of fuel into output passage 52 relative to output passage 54. The increased fuel pressure level in output passage 52 will communicate through passage 106 to control port 90 as does output passage 54 communicate through passage 108 to control port 92. Thus, an increased fuel pressure differential will be developed across said control ports 90 and 92, so as to deflect a higher proportion of the jet of fuel into output passage 102 relative to output passage 104. This increased fuel pressure differential is communicated through passages 132 and 134 to control ports 120 and 122, respectively, which will deflect a higher proportion of the jet of fuel into output passage 128 relative to output passage 130. Therefore, an increase in fuel flow through the variable-area restriction 140 and to the engine 136 will result. Simultaneously, with the increased flow through the restriction 140, an increased fuel pressure differential is provided, by the feedback means described before, to the control ports 96 and 94. The fuel pressure level provided to control port 96 is higher than that of control port 94 to oppose the pressure level acting at control port 90 to again null the fuel injection system.

It is understood that if reduced engine power is desired, the throttle control 176 is closed further to allow less airflow to the combustion engine 136. The reduced airflow through the airflow-sensing device 30 will result in an identical converse action to that described above.

While the specific details have been herein shown and described, the invention is not confined thereto, as other substitutions can be made within the spirit and scope of the invention.

I claim:

1. A fluidic control apparatus for controlling a fluid output in response to a fluid input comprising:
   a source of pressurized fluid;
   a source of relatively lower pressure fluid;
   fluid-receiving means;
   a first passage communicating with said source of relatively lower fluid pressure;
   a second passage communicating with said fluid receiving means;
   means operative to generate a variable control fluid pressure differential;
   proportional fluidic amplifier means operatively connected to said first-named source of pressurized fluid for generating deflectable fluid jet means and provided with a plurality of output fluid ports a first of which output ports communicates with said first passage and a second of which output ports communicates with said second passage;
   said first and second output ports being in fluid flow receiving relationship to said deflectable fluid jet means and separately pressurized in accordance with the degree of deflection of said fluid jet means relative thereto;
   said fluidic amplifier means operatively connected to said variable control fluid pressure differential generating means and responsive to said control fluid pressure differential to cause deflection of said fluid jet means in proportion to said control fluid pressure differential and a corresponding proportional pressurized fluid flow to said second output port and thus said receiving means; and
   a variable-area restriction operatively connected to said second passage for varying the flow area thereof and thus fluid flow therethrough to said receiving means.

2. Fluidic control apparatus as claimed in claim 1 and further including:
   control-trimming means operatively connected to said variable control fluid pressure differential for establishing minimum and maximum values thereof.

3. Fluidic control apparatus as claimed in claim 2 wherein:
   said means operative to generate a variable control fluid pressure includes a fluid flow receiving device having a first output pressurized fluid and a relatively lower second output pressurized fluid which together define said variable control fluid pressure differential which varies as a function of the mass fluid flow through said last named fluid flow receiving means;
   said fluidic amplifier means includes first and second opposed control fluid ports connected to receive said first output pressurized fluid and said second output pressurized fluid, respectively;
   said control trimming means includes a first flow restriction in flow-controlling relationship with said first output pressurized fluid and a second flow restriction in flow-controlling relationship with said second output pressurized fluid; and
   passage means including a third flow restriction communicating the downstream side of said first flow restriction with the upstream side of said second flow restriction.

4. Fluidic control apparatus as claimed in claim 3 wherein: said first flow restriction has a fixed predetermined flow area;
   said second and third flow restrictions are adjustable to vary the effective flow area thereof and thus the area relationship between said first, second and third flow restrictions.

5. Fluidic control apparatus as claimed in claim 1 wherein said apparatus is adapted for use in a combustion engine fuel injection system and said source of pressurized fluid and said source of relatively lower pressure fluid are pressurized fuel.

6. Fluidic control apparatus as claimed in claim 1 wherein:
   said first and second passages are each provided with a check valve to establish one way fluid flow therethrough.

7. Fluidic control apparatus as claimed in claim 1 wherein:
   said fluidic amplifier means includes a first fluidic amplifier having an inlet connected to said first named source for generating a first deflectable fluid jet and provided with a pair of output passages for receiving said first deflectable fluid jet to generate a first output fluid pressure differential;
   said first fluidic amplifier being responsive to said variable control fluid pressure differential for controlling deflection of said first deflectable fluid jet and thus said first output fluid pressure differential;
   a second fluidic amplifier having an inlet connected to said first named source for generating a second deflectable fluid jet and provided with a pair of output passages for receiving said second deflectable fluid jet to generate a second output fluid pressure differential;
   said second fluidic amplifier being responsive to said first output fluid pressure differential for controlling deflection of said second deflectable fluid jet and thus said second output fluid pressure differential;
   a third fluidic amplifier having an inlet connected to said first named source for generating a third deflectable fluid jet and provided with said first and second output ports for receiving said third deflectable fluid jet;
   said third fluidic amplifier being responsive to said second output fluid pressure differential for controlling deflection of said third deflectable fluid jet and thus fluid flow to said fluid-receiving means.

8. Fluidic control apparatus as claimed in claim 7 wherein:
   said second fluidic amplifier is provided with opposed fluid ports between which said second deflectable fluid jet is directed toward said pair of output passages associated therewith;
   said opposed control ports of said second fluidic amplifier being connected to receive said first output fluid pressure differential and impose the same transversely against said second deflectable fluid jet to deflect said second jet;
   said third fluidic amplifier is provided with opposed fluid ports between which said third deflectable fluid jet is directed toward said pair of output passages associated therewith;
   said opposed control ports of said third fluidic amplifier being connected to receive said second output fluid pressure differential and impose the same transversely against said third deflectable fluid jet to deflect said third jet.

9. Fluidic control apparatus as claimed in claim 8 wherein:
   said first, second and third fluidic amplifiers are proportional in operation in that the respective first, second and third deflectable fluid jets thereof are deflected in proportion to the associated pressure differential imposed thereon.

10. Fluidic control apparatus as claimed in claim 7 wherein:
    said variable control fluid pressure differential is derived from pressurized air;
    said first-named source of pressurized fluid and said source of relatively lower pressure fluid are hydraulic fluid;
    said first fluidic amplifier is provided with opposed fluid ports between which said first deflectable fluid jet is directed toward said pair of output passages associated therewith;

said opposed fluid ports being connected to receive said variable control fluid pressure differential and impose the same transversely against said first deflectable fluid jet to deflect said first jet; and a bleed vent operatively connected to each of said pair of output passages receiving said first deflectable fluid jet for venting pressurized air therefrom.

11. Fluidic control apparatus as claimed in claim 7 and further including:

a third passage connecting said second passage upstream from said variable-area restriction to said first passage;

first and second flow restrictions operatively connected in series flow relationship in said third passage;

a fourth passage connecting said second passage downstream from said variable-area restriction to said first passage;

third and fourth flow restrictions operatively connected in series flow relationship in said fourth passage;

said second fluidic amplifier being operatively connected to said third passage intermediate said first and second restrictions and said fourth passage intermediate said third and fourth restrictions and responsive to the fluid pressure differential therebetween which fluid pressure differential varies as a function of the fluid pressure differential generated across said variable-area restriction;

said second deflectable fluid jet being deflected by said last-named fluid pressure differential in opposition to said first output fluid pressure differential.

12. Fluidic control apparatus as claimed in claim 1 and further including:

a third passage connecting said second passage upstream from said variable-area restriction to said first passage;

first and second flow restrictions operatively connected in series flow relationship in said third passage;

a fourth passage connecting said second passage downstream from said variable-area restriction to said first passage;

third and fourth flow restrictions operatively connected in series flow relationship in said fourth passage;

said fluidic amplifier means operatively connected to said third passage intermediate said first and second restrictions and said fourth passage intermediate said third and fourth restrictions and responsive to the fluid pressure differential derived therefrom to cause deflection of said fluid jet means;

said variable control fluid pressure differential and said fluid pressure differential derived from said first and second passages acting in opposition to control deflection of said fluid jet means.

13. Fluidic control apparatus as claimed in claim 12 wherein:

said fluid pressure differential derived from said third and fourth passages is representative of the pressure drop across said variable-area restriction and provides a fluid flow feedback signal in opposition to said variable control fluid pressure differential.